United States Patent Office 3,353,990
Patented Nov. 21, 1967

3,353,990
NOVEL COATED POLYSTYRENE ARTICLES AND METHOD FOR PRODUCING THE SAME
Richard D. Vieth, Butler, and Joseph A. Dooley, Cedar Grove, N.J., and Elihu J. Aronoff, Glen Oaks, and Richard Bolstad, Brooklyn, N.Y., assignors to Interchemical Corporation, New York, N.Y., a corporation of Ohio
No Drawing. Filed Jan. 31, 1964, Ser. No. 341,734
16 Claims. (Cl. 117—138.8)

ABSTRACT OF THE DISCLOSURE

A method of coating polystyrene with a thermoplastic moisture barrier coating, which is a copolymer of 70 to 80% of vinylidene chloride and at least 15% of acrylic acids or itaconic acid in a volatile organic solvent, which is composed of a major amount of a saturated lower alkanol and a minor amount of a ketone or an ester solvent. A polystyrene article, coated by this method, is also disclosed.

This invention relates to a novel coated polystyrene. The gloss, toughness, clarity and inexpensiveness of polystyrene are properties which would make it highly desirable for packaging films and sheets, particularly films and sheets to be used in the food packaging field. However, polystyrene sheets and film have the following deficiencies with respect to their use in food packaging: they have high permeability to moisture and to many gases.

High vinylidene chloride-content copolymers are known to provide coatings having a low permeability to moisture and to gases. In addition, these coatings are also known for their high grease resistance which is another feature highly desirable in food packages.

Attempts to coat polystyrene sheets with high vinylidene chloride-content copolymers have met with little success in the past. What attempts have been made employed high content vinylidene chloride/acrylonitrile copolymers of the Saran type. Latices of high vinylidene chloride-content copolymers failed to display any adhesion to polystyrene sheets. Attempts have been made to improve this adhesion by using blends of these latices with thermosetting resins such as amine-aldehyde resins. Such blends still displayed less than desirable adhesion, and in addition, because of the poor flow characteristics of high vinylidene chloride-content latices in general could not be used in operations such as roller coating and coating with flexographic or gravure presses. These operations are those predominantly used for coating food packaging materials.

Efforts have also been made to coat polystyrene with Saran type high vinylidene chloride-content copolymers by applying solutions of the copolymers in solvents such as ketones including acetone and methyl ethyl ketone, ester solvents, tetrahydrofuran and aromatic hydrocarbon solvents. These efforts have failed because all of these solvents caused severe crazing in the polystyrene sheets with the attendant loss of clarity as well as other distortion of the polystyrene substrate.

It has now been found that novel coated polystyrene sheets having a coating of a copolymer at least 70% vinylidene chloride and a major portion of the remainder of the copolymer being an acid selected from the group consisting of itaconic acid and acrylic acids may be produced by the application to polystyrene of novel coating compositions of unique high content vinylidene chloride/acid copolymers described in copending application S.N. 341,-701 in the names of R. Bolstad, E. Aronoff, P. Whyzmuzis and E. Maloney filed on January 31, 1964, and now U.S. Patent 3,326,838. This copending application is incorporated by reference into the present application.

Specifically the compositions used in this invention are solutions of novel copolymers of 70% to 80% vinylidene chloride and at least 15% of an acid component selected from the group consisting of itaconic acid and acrylic acids (which is meant to include both acrylic and methacrylic acids) in a volatile organic solvent comprising a major portion, most preferably from 80% to 90% of a $C_1$ to $C_4$ saturated aliphatic alcohol and the remainder either a ketone or ester solvent.

These high alcohol-content solvents do not craze or in any other manner distort the polystyrene sheets. The solubility in high alcohol-content solvents is unique to the novel copolymers described in said copending application. Attempts to dissolve conventional high vinylidene-chloride-content copolymers in these high alcohol-content solvents failed.

These conventional vinylidene chloride copolymers would not tolerate the amounts of alcohol in the solution necessary to prevent the crazing and other distortion and would precipitate in the presence of alcohol.

It should be noted that in the present specification and claims, all proportions are by weight unless otherwise set forth.

The novel copolymers have a molecular weight in the range 3,000 to 5,000. In addition to the vinylidene chloride and the acid components, the novel copolymers may contain small amounts of a wide variety of olefinically unsaturated monomers as described in said copending application.

The alcohols used in the coating compositions of this invention are $C_1$ to $C_4$ unsaturated aliphatic alcohols including methanol, ethanol, isopropanol, n-propanol and butanol. The ketones used may include methyl ethyl ketone, acetone and methyl isobutyl ketone. The ester solvents used may include butyl-acetate, isopropyl acetate, n-propyl acetate, ethyl acetate and acetate.

It should be noted that the coating used in this invention exhibits excellent adhesion to the polystyrene. In addition, the coated structures have very low permeability to moisture or gases, excellent flexibility, clarity, grease resistance and ruggedness.

In carrying out the method of this invention, the coatings may be applied by any method to the polystyrene sheets; however, the application is preferably by roller coating, flexographic press coating or gravure coating.

The following examples will further illustrate this invention.

The adhesion of the coating to the substrate may be further increased by the conventional expedient of including small amounts (1% based on the total solvent weight) of an aromatic solvent such as toluene in the coating composition.

Example 1

| | Parts by weight |
|---|---|
| Vinylidene chloride | 75 |
| Acrylic acid | 25 |
| Ethyl acetate | 54 |
| Lauryl peroxide | 3 |

The above ingredients are placed in a kettle and maintained at a temperature of 60° C. under an inert atmosphere for 17 hours with continuous agitation. There is at least a 98% conversion of monomers to copolymer.

Example 2

| | Parts by weight |
|---|---|
| Vinylidene chloride | 75 |
| Acrylic acid | 25 |
| Methyl ethyl ketone | 54 |
| Lauryl peroxide | 3 |

Following the procedure and conditions of Example 1, the above ingredients are reacted with over a 98% conversion of monomers to copolymer.

Example 3

| | Parts by weight |
|---|---|
| Vinylidene chloride | 75 |
| Methacrylic acid | 25 |
| Methyl ethyl ketone | 100 |
| Lauryl peroxide | 3.0 |

Following the procedure and conditions of Example 1, the above ingredients are reacted with over a 95% conversion of monomers to copolymer.

Example 4

| | Parts by weight |
|---|---|
| Vinylidene chloride | 78 |
| Itaconic acid | 22 |
| Methyl ethyl ketone | 100 |
| Lauryl peroxide | 1.5 |
| Acetyl peroxide | 1.5 |

The above ingredients are reacted in accordance with the procedure and conditions of Example 1 with a 98% conversion of monomers to copolymer.

Example 5

| | Parts by weight |
|---|---|
| Vinylidene chloride | 75 |
| Ethyl acrylate | 10 |
| Acrylic acid | 15 |
| Ethyl acetate | 54 |
| Lauryl peroxide | 3 |

The above ingredients are reacted in accordance with the procedure and conditions of Example 1 with over a 98% conversion of monomers to copolymer.

Example 6

To the solution of Example 2, there is added 46 parts of methyl ethyl ketone, 1500 parts of ethanol and 15 parts of toluene to provide a 15:1 ratio of ethanol:methyl ethyl ketone. The resulting solution is coated upon polystyrene film of a thickness of 1.0 mil and a moisture vapor transmission[1] of 8 to 9 g./100 square inches/24 hours at a wet coating thickness of 0.75 mil. and the coating is heated at 180° F. for about 10 seconds. The resulting coating is clear, white, displays excellent adhesion to the polystyrene and has a moisture vapor transmission of about 2 to 3 g./100 square inches/24 hours. In addition, the polystyrene substrate has an unchanged appearance with no crazing or other distortion.

Example 7

To the solution of Example 3, there is added 150 parts of isopropanol and 2 parts of toluene, and the resulting solution is coated upon polystyrene film as described in Example 6 in accordance with the conditions and procedure of Example 6. The resulting coating has the same desirable properties as the coating of Example 6.

Example 8

To the solution of Example 4, there is added 1500 parts of ethanol, and the resulting solution is coated upon polystyrene film as described in Example 6 in accordance with the conditions and procedure of Example 6. The resulting coating has the same desirable properties as the coating of Example 6.

Example 9

Example 6 is repeated using the same ingredients, proportions, conditions and procedure except that the solution of Example 5 is used instead of the solution of Example 2. The resulting coating has the same desirable properties as the coating of Example 6.

While there have been described what is at present considered to be the preferred embodiments of this invention it will be obvious to those skilled in the art that various changes and modifications may be made therein without departing from the invention, and it is, therefore, aimed to cover all such changes and modifications as fall within the true spirit and scope of the invention.

What is claimed is:

1. An article comprising a polystyrene substrate carrying a thermoplastic coating of a copolymer consisting essentially of from 70% to 80% vinylidene chloride and at least 15% of an acid component selected from the group consisting of acrylic acid, methacrylic acid, and itaconic acid.

2. The article of claim 1 wherein said acid component is acrylic acid.

3. The article of claim 1 wherein said acid component is methacrylic acid.

4. The article of claim 1 wherein said acid component is itaconic acid.

5. The article of claim 1 wherein said substrate is a polystyrene film.

6. An article comprising a polystyrene film carrying a thermoplastic coating of a copolymer consisting essentially of 75% vinylidene chloride and 25% acrylic acid.

7. An article comprising a polystyrene film carrying a thermoplastic coating of a copolymer consisting essentially of 75% vinylidene chloride and 25% itaconic acid.

8. A method of coating polystyrene with a moisture barrier coating which comprises applying to a polystyrene substrate a composition of a copolymer consisting essentially of 70% to 80% vinylidene chloride and at least 15% of an acid component selected from the group consisting of acrylic acid, methacrylic acid and itaconic acid in a volatile organic solvent comprising a saturated $C_1$ to $C_4$ aliphatic alcohol and a minor portion of member selected from the group consisting of ketone solvent and ester solvents, said alcohol being a major portion of said solvent, and drying the coating to remove the solvent.

9. The method of claim 8 wherein said acid component is acrylic acid.

10. The method of claim 8 wherein said acid component is itaconic acid.

11. The method of claim 8 wherein the copolymer consists essentially of 75% vinylidene chloride and 25% acrylic acid.

12. The method of claim 8 wherein the copolymer consists essentially of 75% vinylidene chloride and 25% itaconic acid.

13. A method of coating polystyrene with a moisture barrier coating which comprises applying to a polystyrene substrate a composition of a copolymer consisting essentially of 70% to 80% vinylidene chloride and at least 15% acrylic acid in a volatile organic solvent comprising from 2% to 20% ester solvent, and the remainder saturated $C_1$ to $C_4$ aliphatic alcohol and drying the coating to remove the solvent.

14. The method of claim 13 wherein the ester solvent is ethyl acetate.

15. A method of coating polystyrene with a moisture barrier coating which comprises applying to a polystyrene substrate a composition of a copolymer consisting essentially of 70% to 80% vinylidene chloride and at least 15% acrylic acid in a volatile organic solvent comprising from 2% to 20% ketone solvent and the remainder saturated $C_1$ to $C_4$ aliphatic alcohol and drying the coating to remove the solvent.

---

[1] Moisture vapor transmission is determined by covering the mouth of a cup of a selected diameter containing calcium chloride with the material to be tested, exposing the cup to an atmosphere of about 95 to 100% relative humidity for 24 hours and then determining the gain in weight of the calcium chloride.

16. The method of claim 15 wherein the ketone solvent is methyl ethyl ketone.

References Cited

UNITED STATES PATENTS

| | | | |
|---|---|---|---|
| 2,578,665 | 12/1951 | Bjorksten et al. | 117—138.8 X |
| 2,801,936 | 8/1957 | Bjorksten et al. | 117—138.8 |
| 2,991,199 | 7/1961 | Park et al. | 117—138.8 |
| 3,022,198 | 2/1962 | Hahn | 117—161 X |
| 3,030,325 | 4/1962 | Scopp | 117—138.8 X |
| 3,058,846 | 10/1962 | Hahn | 117—138.8 |
| 3,124,476 | 3/1964 | Park et al. | 117—119.6 X |
| 3,128,200 | 4/1964 | Park et al. | 117—138.8 X |
| 3,177,087 | 4/1965 | Park et al. | 117—138.8 X |
| 3,251,817 | 5/1966 | Hahn et al. | 117—161 X |

FOREIGN PATENTS

| | | |
|---|---|---|
| 659,359 | 3/1963 | Canda. |

WILLIAM D. MARTIN, *Primary Examiner.*

M. R. LUSIGNAN, *Assistant Examiner.*

UNITED STATES PATENT OFFICE
CERTIFICATE OF CORRECTION

Patent No. 3,353,990                              November 21, 1967

Richard D. Vieth et al.

It is hereby certified that error appears in the above numbered patent requiring correction and that the said Letters Patent should read as corrected below.

Column 2, line 50, beginning with "sistance and ruggedness." strike out all to and including "position." in line 55, and insert the same after "grease re-" in line 44, same column 2.

Signed and sealed this 21st day of January 1969.

(SEAL)
Attest:

Edward M. Fletcher, Jr.
Attesting Officer

EDWARD J. BRENNER
Commissioner of Patents